United States Patent
Matsumoto et al.

[11] Patent Number: 5,882,522
[45] Date of Patent: Mar. 16, 1999

[54] PAINT RECOVERING METHOD AND COLLECTING MATERIAL

[75] Inventors: Koichi Matsumoto; Koryo Ito, both of Shizuoka; Tetsuya Hirota; Hiroaki Maruoka, both of Hyogo, all of Japan

[73] Assignees: Asahi Kasei Kogyo Kabushiki Kaisha; Shinto Paint Co. Ltd., both of Japan

[21] Appl. No.: 913,229

[22] PCT Filed: Jan. 6, 1997

[86] PCT No.: PCT/JP97/00001

§ 371 Date: Sep. 9, 1997

§ 102(e) Date: Sep. 9, 1997

[87] PCT Pub. No.: WO97/25154

PCT Pub. Date: Jul. 17, 1997

[30] Foreign Application Priority Data

Jan. 10, 1996 [JP] Japan ................................ 8-20378
Nov. 11, 1996 [JP] Japan ............................... 8-312618

[51] Int. Cl.$^6$ .................................................. B01D 61/00
[52] U.S. Cl. ................ 210/651; 210/500.23; 210/321.8; 210/321.87; 118/610
[58] Field of Search ............................. 210/651, 500.23, 210/321.78, 321.8, 321.87, 321.89; 118/603, 610, 600

[56] References Cited

U.S. PATENT DOCUMENTS

| | | | |
|---|---|---|---|
| 3,891,547 | 6/1975 | Chang et al. | 210/321.78 |
| 4,265,642 | 5/1981 | Mir et al. | 210/650 |
| 4,353,715 | 10/1982 | Mir et al. | 210/651 |
| 5,009,758 | 4/1991 | Okada et al. | 118/66 |
| 5,248,424 | 9/1993 | Cote et al. | 210/321.8 |
| 5,319,017 | 6/1994 | Uenoyama et al. | 524/514 |
| 5,358,689 | 10/1994 | Jones et al. | 210/321.81 |
| 5,492,626 | 2/1996 | Uenoyama et al. | 210/651 |

FOREIGN PATENT DOCUMENTS

| | | |
|---|---|---|
| 51-50950 | 5/1976 | Japan . |
| 51-120972 | 10/1976 | Japan . |
| 52-119647 | 10/1977 | Japan . |

*Primary Examiner*—Ana Fortuna
*Attorney, Agent, or Firm*—Kennedy Covington Lobdell & Hickman, LLP

[57] ABSTRACT

The present invention offers a method for recovering the paints suitable to an object that, in a booth for a spray coating used for coating a material, the oversprayed paints can be easily recovered and recycled as they are or after a simple adjustment as reusable paints and it also offers a receiver used for said recovery. A method for recovering paints, characterized in that, a receiver using an ultrafiltration membrane or a microfiltration membrane is placed in a spray coating booth and water or organic solvent is contacted the one side of said membrane so that the oversprayed paint are received on the other side of said membrane and recovered therefrom; and a receiver for recovering paints, characterized in that, said receiver has two or more hollow fiber membranes arranged on a plate where at least one end of the membranes is open, with a fixing material which fixes and holds the hollow fiber membranes on the plate and distributing pipes connecting to the open end of each of the hollow fiber membrane.

3 Claims, 7 Drawing Sheets

PAINT RECOVERING METHOD AND COLLECTING MATERIAL

DETAILED DESCRIPTION OF THE INVENTION

1. Technical Field

The present invention relates to a method for recovering the paints suitable to an object that, in a booth for a spray coating used for coating a material, the oversprayed paints can be easily recovered and recycled as they are or after a simple adjustment as reusable paints and it also relates to a receiver used for said recovery.

2. Background Art

With an object of prevention of environmental pollution and others, a method for recovering oversprayed paints during a course of coating a material has been conducted already. Said method is roughly classified into a dry method and a wet one. The dry method is a method where oversprayed paints are received by fencing boards or by a filter made of glass wool, nonwoven fabric, paper, etc. while the wet method is a method where the oversprayed paints are received by a liquid mist such as water and oil, a curtain-like liquid flow, a tank for recovered liquid, etc.

However, in a dry method, it is difficult to easily peel off and remove the oversprayed paints which are received by the fencing boards or by a filter made of glass wool, nonwoven fabric, paper, etc. Therefore, it is common that, after being used for a certain period, both filter and oversprayed paint are not recycled but are discarded whereby an increase in running cost for exchanging the filter and an environmental problem due to production of industrial wastes are resulted. In a wet method, it is common that the oversprayed paints which are received by a liquid mist such as water and oil, a curtain-like liquid flow, a tank for recovered liquid, etc. are subjected to a solid-liquid separation using an agent called a deblocking agent and the oversprayed paints solidified as such are discarded whereby there is an environmental problem due to a production of industrial wastes. In a wet method, another means is conducted too where the recovered liquid in which the oversprayed paints are received is concentrated and the paints are regenerated and recycled. In said means, however, an apparatus for treating the recovered liquid by which concentration, adjustment of the paints, etc. is necessary and, therefore, recovery and recycling of the oversprayed paints are not easy. Under such present circumstances, there has been a demand for a method for recovering the paints that, in a booth for a spray coating used for coating a material, the oversprayed paints can be easily recovered and recycled as they are or after a simple adjustment as reusable paints and also for a receiver used for said recovery.

The present invention has been achieved for solving the problems mentioned hereinabove and an object of the present invention is to offer a method for recovering the paints suitable to an object that, in a booth for a spray coating used for coating a material, the oversprayed paints can be easily recovered and recycled as they are or after a simple adjustment as reusable paints and also to offer a receiver used for said recovery.

DISCLOSURE OF THE INVENTION

The present inventors have conducted an intensive study on a method of recovering the paints for solving the above problems and have found that, when a receiver using a ultrafiltration membrane (UF membrane) or a microfiltration membrane (MF membrane) is placed before a filter or a wet dust collector for receiving the oversprayed paints or is placed instead of such a filter or a wet dust collector and then water is passed through the UF membrane or the MF membrane in case the paints are aqueous type or, in case the paints are organic solvent type, an organic solvent is passed therethrough, then the oversprayed paints adhered onto the receiver flow down to a gravitational direction and, as a result, the oversprayed paints which are capable of being reused as they are or after a simple adjustment can be recovered under the receiver. When the surface of the receiver is made of an UF or MF membrane and then water or organic solvent is passed through the UF or MF membrane, surface of the receiver becomes in a wet state by water or organic solvent which is permeated from the UF or MF membrane whereby the oversprayed paints adhered on the receiver surface are not dried but flow down to the gravitational direction. It has now been found that, when the paints are recovered by the method of the present invention, the receiver (UF or MF membrane) is hardly stained by the paints since water or organic solvent is always oozed out from the receiver (UF or MF membrane) and, since the amount of water or organic solvent used is small, the paints can be efficiently recovered without too much dilution. Based upon such a finding, the present inventors have found a method for recovering the paints suitable to an object that, in a booth for a spray coating used for coating a material, the oversprayed paints can be easily recovered and recycled as they are or after a simple adjustment as reusable paints and also a receiver used for said recovery whereupon the present invention has been achieved.

Thus, the present invention relates to a method for recovering paints, characterized in that, a receiver using an ultrafiltration membrane or a microfiltration membrane is placed in a spray coating booth and water or organic solvent is contacted the one side of said membrane so that the oversprayed paint are received on the other side of said membrane and recovered therefrom.

The present invention also relates to a receiver for recovering paints, characterized in that, said receiver has two or more hollow fiber membranes arranged on a plate where at least one end of the membranes is open, with a fixing material which fixes and holds the hollow fiber membranes on the plate and distributing pipes connecting to the open end of each of the hollow fiber membrane.

BEST MODE FOR CONDUCTING THE INVENTION

It is most preferred that the receiver used in the present invention is placed in a spray coating booth although the receiver may be placed and used in any other place upon conducting a coating. With regard to a spray booth, dry and wet systems which have been known already may be used. In that case, it is necessary that, based upon the location of the coating machine, the receiver is placed behind or side of the material to be coated and before the filter or the wet dust collector receiving the spray coating booth although it is also possible that the receiver is placed instead of the filter or the wet dust collector which receives the paints in the spray coating booth.

Figure 1:
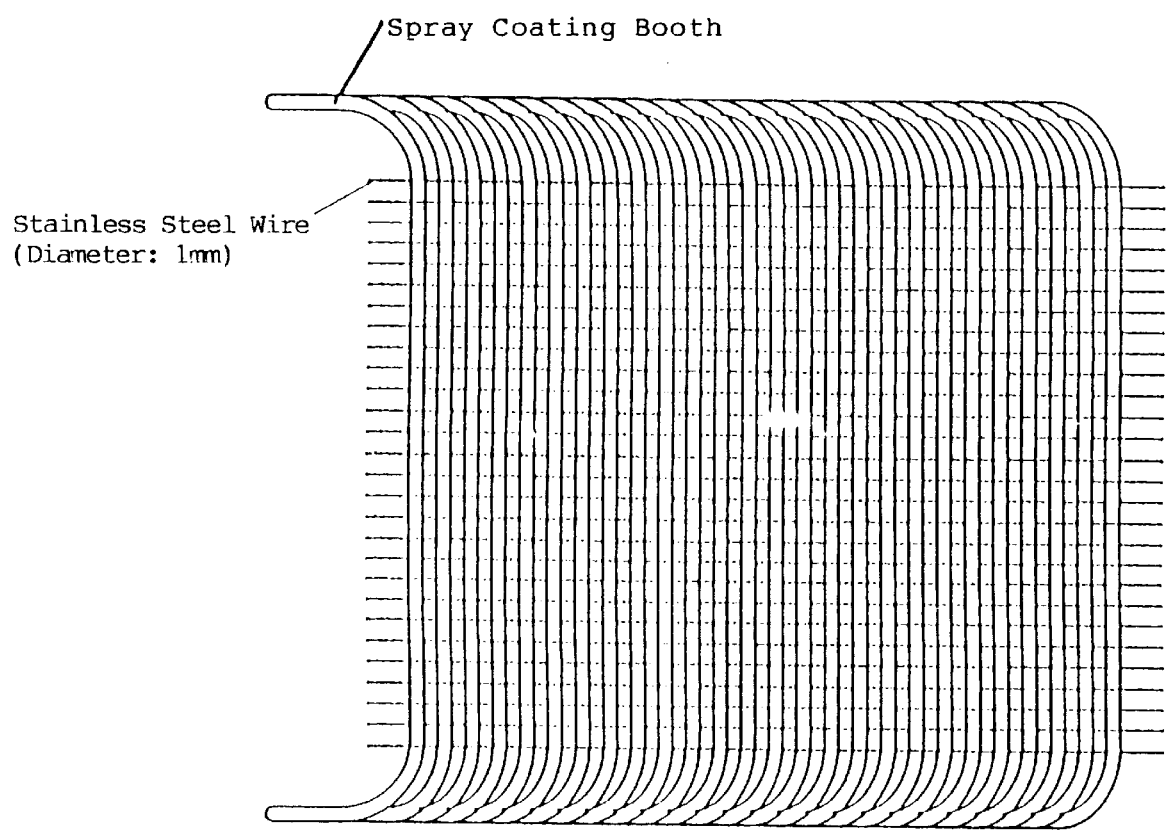
FIG. 1 shows an outline of a receiver where the hollow fiber of UF membrane is processed into a net-like shape.
Figure 2:
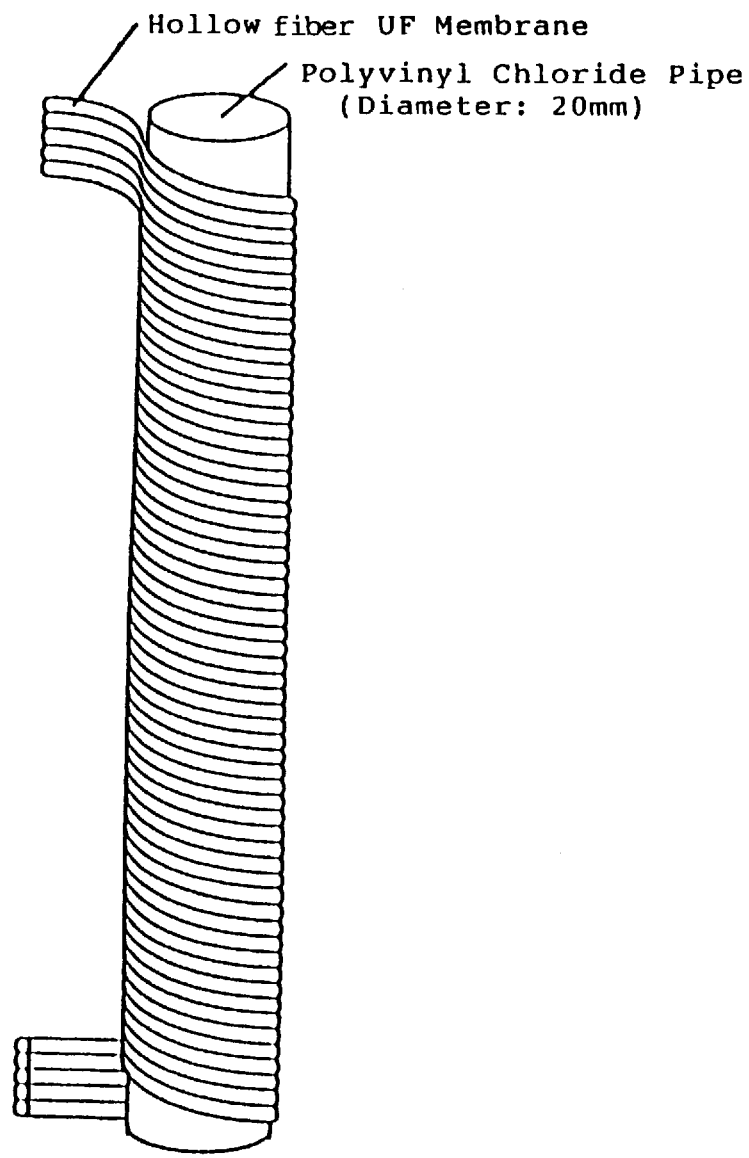
FIG. 2 shows an outline of a receiver where the hollow fiber of UF membrane is spirally wound on the surface of a rod-like support.
Figure 3:
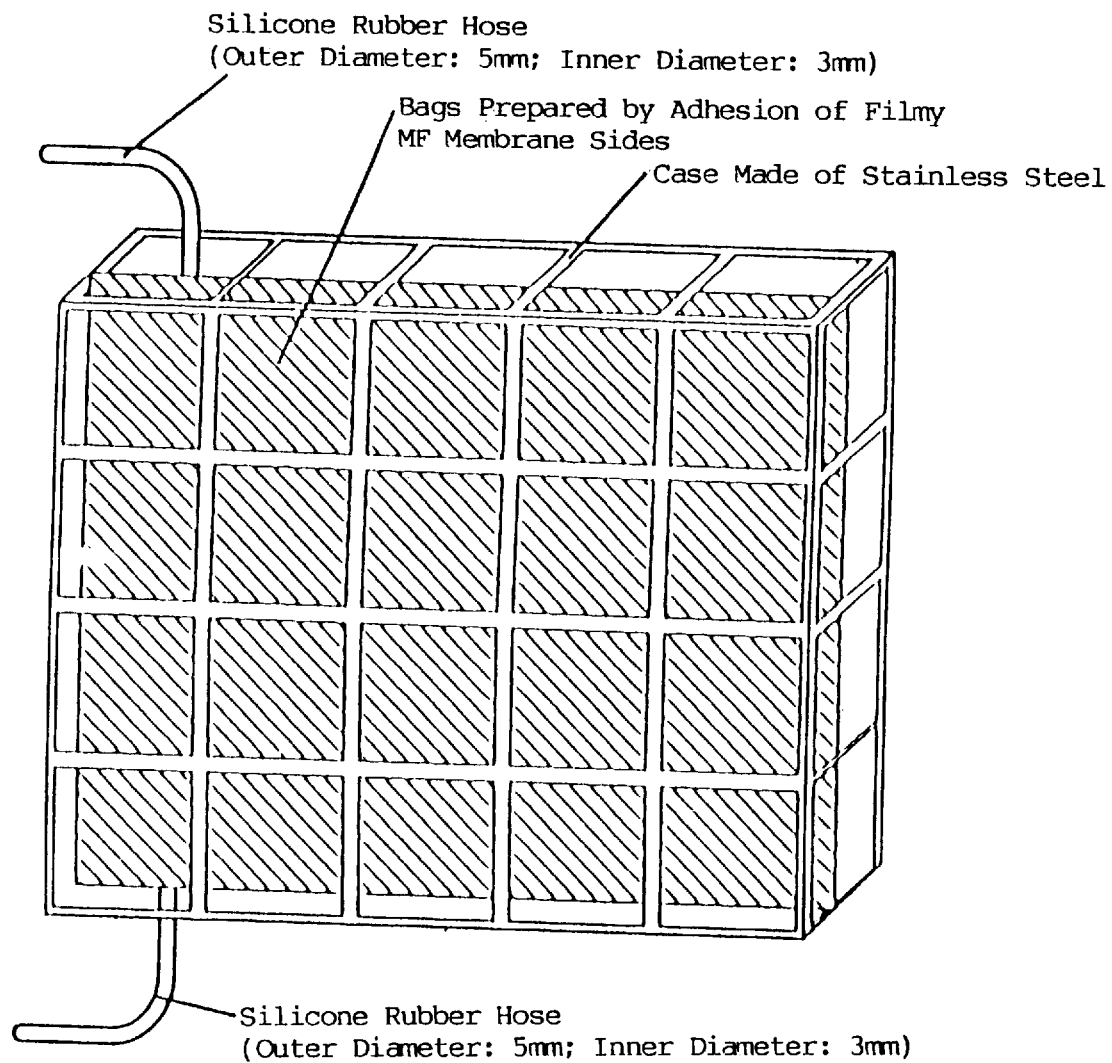
FIG. 3 shows an outline of a receiver where the film of MF membrane is processed into a bag-like shape.

The receiver used in the present invention may be in any shape, any size and any number. When, however, hollow fiber membrane of UF or MF membrane is used, it is preferred that, as shown in FIG. 1, hollow fiber membrane of UF or MF membrane is made into a net-like shape and placed in a single or plural layer(s) or, as shown in FIG. 2, hollow fiber membrane of UF or MF membrane is spirally wound on the surface of a support column followed by setting up vertically. When plural fiber s are placed in plural rows with certain intervals, that is most preferred. Alternatively, as shown in FIG. 3, when film of UF or MF membrane is used, said film is made into a shape of a bag or said film is placed at the side where overspraying is received while a material which does not permeate water or organic solvent is placed at the side where overspraying is not received and is made into a shape of a bag and such bags are set up in a single or plural layer(s). Such a receiver is placed before the filter or the wet dust collector receiving the oversprayed paints or is placed instead of the filter or the wet dust collector. It is also possible that the receiver is placed particularly at the part where the amount of the oversprayed paints are too much.

Principally, the receiver which is used in the present invention may be any membrane which permeates water or organic solvent in regardless of the degree of the pressure. Commonly used receivers are membranes such as an MF membrane and an UF membrane.

It is necessary that the receiver used in the present invention is capable of passing water or organic solvent therethrough but, depending upon the type of the UF or MF membrane used and the structure of the receiver, it is also possible to pass by means of a capillary phenomenon, a siphonage or a compulsory compressing. With respect to water and organic solvent which is passed through the UF or MF membrane, that which is able to dissolve the paints used for the coating is used. With respect to the organic solvent, that which is selected from hydrocarbons such as xylene, alcohols such as ethyl alcohol, ethers such as diethyl carbitol, ketones such as methyl ethyl ketone, esters such as acetates and ether alcohols such as butyl carbitol as well as two or more of them as a mixed organic solvent may be used. The organic solvent which is a constituting component of the paints used is preferred and that which has a low volatility at ambient temperature is most preferred.

Coating of the paint used in the present invention can be conducted by coating means such as an air spray coating, an airless spray coating and an electrostatic coating while it is also possible to conduct by means of a shower coating, a curtain flow coating, etc.

With respect to the paint used in the present invention, any paint may be used so far as it contains water or organic solvent and its examples are alkyd resin paints, acryl resin paints, polyester resin paints, vinyl resin paints, melamine resin paints, epoxy resin paints and urethane resin paints.

In the present invention, the oversprayed paint adhered onto the receiver flows down to the gravitational direction and is recovered at the lower part of the receiver and it is also possible that a receiver is placed in the direction of a slope or an inclined board or the like is placed under the receiver so that the oversprayed paint is recovered at the side of the receiver. A recovering tank may be placed at the area where the oversprayed paint flows down to a gravitational direction so that the paint can be collected thereby. The recovered paint can be reused as it is or after adjustment. In case an adjustment is necessary, diluents such as hydrocarbons, alcohols, ethers, ketones, esters, ether alcohols and water, neutralizers such as amines and acids and other additives are added thereto depending upon the components of the oversprayed paint followed by mixing and filtering for reuse.

Figure 6:
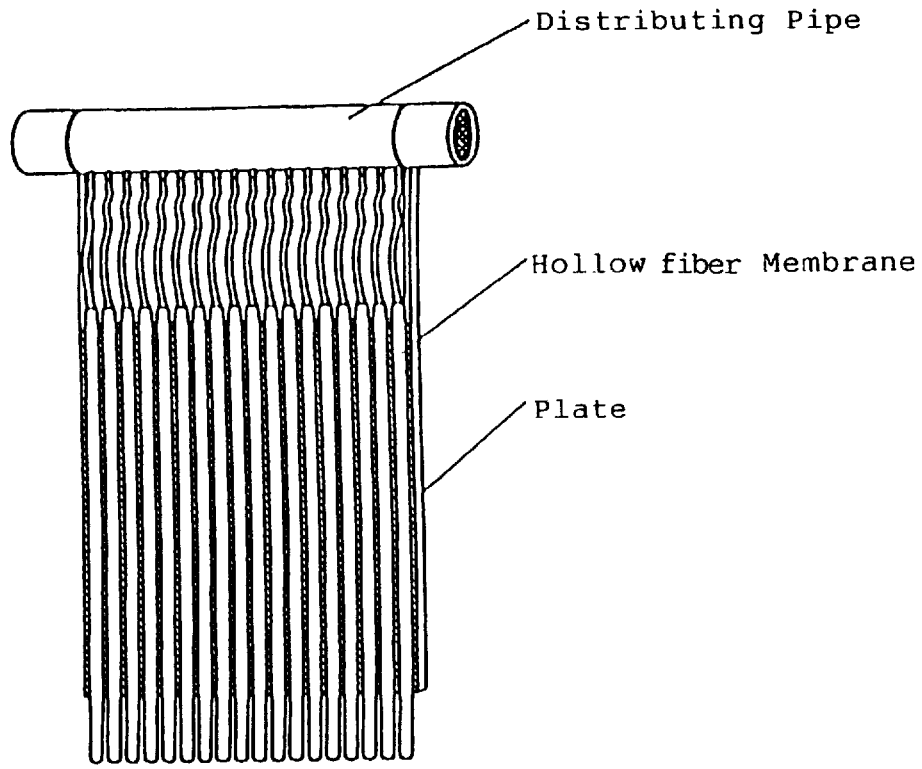
FIG. 6 is an oblique view showing an example of a receiver of the present invention.
Figure 7:
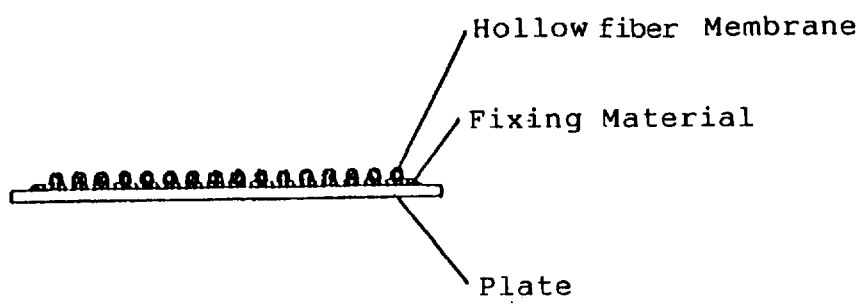
FIG. 7 is an oblique cross-sectional view showing an example of a receiver of the present invention.

One specific example of the receiver of the present invention will be explained hereunder by referring to FIG. 6 and FIG. 7. On a plate (2), many hollow fiber membranes (1) having opening(s) either one or both end(s) thereof are arranged in parallel with predetermined intervals and fixed and held by a fixing material (3) while, at an open end of the hollow fiber membrane (1), there is a distributing pipe (4) connecting therewith.

Usually, the receiver of the present invention is used by placing it vertically and, when compressed water, aqueous solution containing amine or solvent contained in the aqueous paint or organic solvent contained in the paint of organic solvent type is supplied to the distributing pipe, water or said aqueous solution or organic solvent oozes out from the surface of each of the hollow fiber membranes to keep the hollow fiber membrane surface in a wet state whereby the adhered oversprayed paint (an aqueous paint, a paint of an aqueous type such as an aqueous dispersion type or a paint containing organic solvent) is washed out and flown down to the gravitational direction. As a result of collecting this flown down liquid, it is now possible to recover the oversprayed paint.

Thus, the receiver of the present invention utilizes the characteristics that, because of the use of water or organic solvent, aqueous type paint or organic solvent type paint is not dried due to water or organic solvent oozing out to the surface of the hollow fiber membrane. Since the surface of the hollow fiber membrane is always in a wet state as such, the oversprayed paint is not adhered and, in addition, an adhesion can be prevented by small amount of water or organic solvent whereby the paint can be recovered without too much dilution.

Depending upon the area necessary for receiving, any size and any numbers of the receiver may be used in the present invention. However, when a unit area becomes too large, its manufacture becomes difficult or the handling becomes troublesome and, therefore, two or more receivers arranged in parallel may be used. In case two or more receivers are used, it is preferred that they are arranged in front and rear with appropriate intervals so that, when ventilation is conducted, the oversprayed paint is sent to the receivers and can be surely received.

The pore size of the UF and MF membranes used in the present invention is 0.001-10 micrometers or, preferably, 0.001-0.1 micrometer and can be selected within a wide range from an extent of ultrafiltration membrane to that of a microfiltration membrane. There is no limitation for the structure of the membrane as well although it is preferred to use a lowly permeating membrane which is capable of minutely controlling the amount of water or organic solvent which is oozed out. Examples of the material for the membrane are organic polymer materials such as polyethylene, polypropylene, polyvinylidene fluoride, polyvinylidene 4-fluoride, polysulfone, polyether sulfone, polyacrylonitrile, polyamide and cellulose types and inorganic materials such as alumina and silicon carbide and, although there is no particular limitation therefor, membranes having an affinity to water or to organic solvent is particularly preferred because the membranes having no affinity thereto form droplets of a relatively big size when water or organic solvent is oozed out from the surface resulting in a low wetting on the surface. With respect to the thickness of the hollow fiber membrane used here in terms of an outer diameter, it is 0.5–6 mm, preferably 1–6 mm and, more preferably, 2–6 mm. When the outer diameter is 1 mm or smaller however, attachment of the distributing pipe thereto is difficult and a surface area occupying in a receiver is big and, therefore, a minute control of water or organic solvent oozing out therefrom is difficult. Accordingly, thick hollow fiber membranes are preferred. Incidentally, with respect to the inner diameter, it is sufficient if water or organic solvent can pass therethrough and said inner diameter can be set freely.

With respect to the interval among the hollow fiber membranes, the hollow fiber membranes may be arranged in such a manner that they are placed adjacently or, at the longest, they are placed with an interval corresponding to the outer diameter of the hollow fiber membranes. When the interval is longer than the outer diameter of the hollow fiber membranes, it is not possible to keep the moisture of the intervals between the hollow fiber membranes and the plate within such an extent that the oversprayed paint is not adhered thereto and, as a result thereof, adhesion of said paint to the plate is resulted.

With respect to the length of the hollow fiber membrane, it is preferred that the length is made a bit longer than that of the plate in view of attachment of a distributing pipe to an upper end of the plate and also of collection of the oversprayed paint flown down beneath the plate.

With respect to a fixing material used for the receiver of the present invention, any material may be used so far as it is an adhesive agent which is capable of adhering the hollow fiber membrane to the plate and its examples are epoxy resin, urethane resin and silicone resin. If there is no problem of its removal due to wetting by water or by organic solvent, fixing and holding of the hollow fiber membrane may be conducted even by a method where a sticking tape having adhesives on both sides thereof is attached thereto.

With respect to a material for the plate used in the receiver of the present invention, those which have satisfactory resistance to solvents and do not absorb water therewith such as SUS, vinyl chloride, polyethylene and polypropylene may be freely selected and used. There is no particular limitation for the thickness of the plate but, in view of a practical use, the thickness giving no bending or weighing down is necessary. Incidentally, the plate is quite essential for making the hollow fiber membranes adjacent each other without curling or bending, for fixing/holding them with certain intervals and also for keeping the efficiency for receiving the oversprayed paint when certain intervals are formed among the hollow fiber membranes.

The distributing pipe used in the receiver of the present invention is a pipe having the same numbers of nozzles as the numbers of the hollow fiber membranes and, for connecting each of the nozzles with the open end of the hollow fiber membrane, various types of tubes, capillary tubes, etc. may be used. The connection is conducted by means of insertion, adhesion, fusion, etc. Incidentally, the distributing pipe is used for supplying water, an aqueous solution containing amines or solvent or an organic solvent contained in a paint of an organic solvent type and, when both ends of the hollow fiber membrane are open, it is possible that one end is used for supplying the above-mentioned water, aqueous solution or organic solvent while another end is used as a liquid-collecting tube for circulating said water, aqueous solution or organic solvent.

As such, the receiver of the present invention is applicable to an aqueous paint and to a paint of an aqueous type such as a water dispersion type and, moreover, it is applicable to a paint of an organic solvent type when a material which is not deteriorated by organic solvents is used for the hollow fiber membrane and for the fixing material followed by supplying the organic solvent into the hollow fiber membranes.

Now, a method for manufacturing the receiver of the present invention will be mentioned. Thus, the hollow fiber membrane is placed in grooves of a grooved plate and, at the same time, a plate to which a fixing material is coated is held on the above-mentioned plate so that the hollow fiber membrane is transferred and fixed onto the plate and then a distributing pipe connecting to an open end of each of the hollow fiber membranes is attached thereto. With respect to the grooves used here, it is preferred that their size is almost same as the outer diameter of the hollow fiber membrane so that said membrane can be surely placed therein while their depth is made to such an extent that the surface of the hollow fiber membrane is slightly projected out therefrom. With respect to the fixing material, various kinds of adhesives may be used as mentioned already and, when it is applied to the plate, spraying is most commonly used although application by means of a roller or a brush is possible as well. When viscosity of the fixing material used is too high whereby the spraying is difficult, the material may be used after diluting with a solvent. Application may be done all over the plate or may be done partially so that a part of the hollow fiber membrane is held and fixed. After the application, the coated surface is kept on the above-mentioned plate where the hollow fiber membrane is placed and allowed to stand until the fixing material becomes hard whereby the transfer and the fixing are completed.

Figure 8:
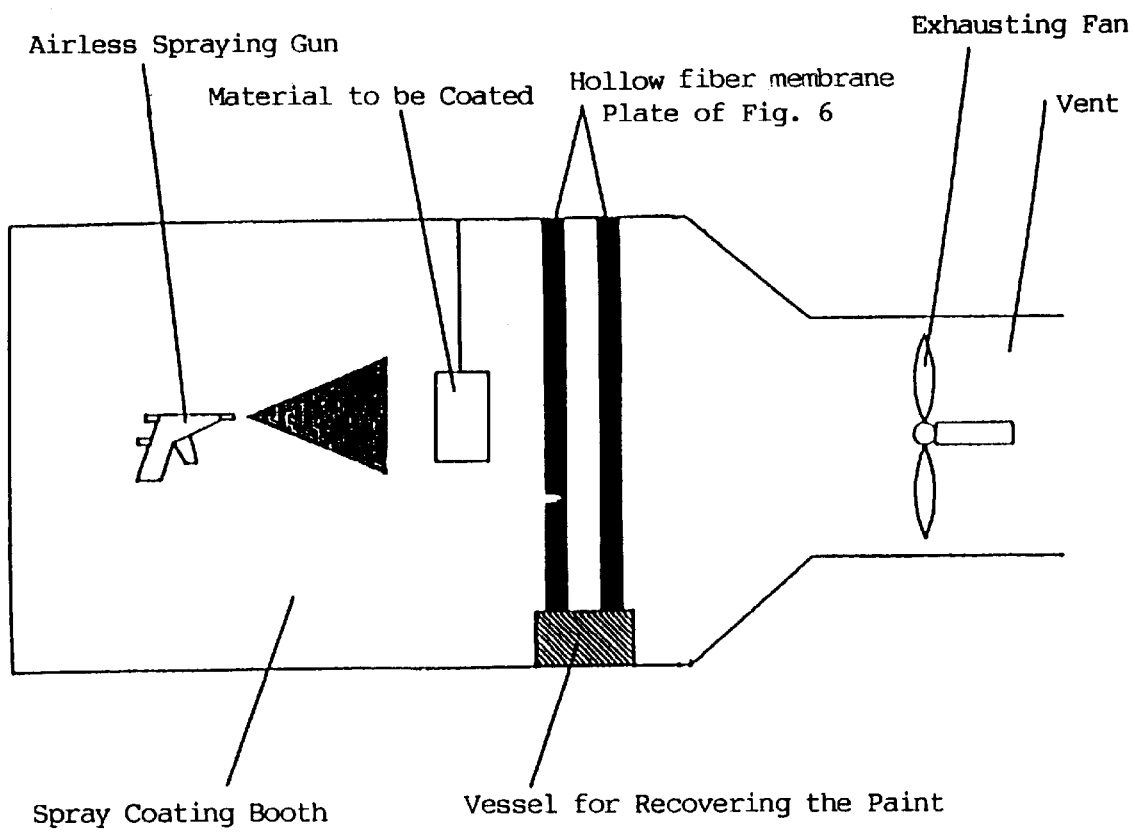
FIG. 8 is an outline of a spraying booth equipped with the receiver of the present invention.

Now, an embodiment where the receiver of the present invention is used as a receiver for an oversprayed paint will be illustrated by referring to FIG. 8. Thus, when an aqueous paint is sprayed from an air spraying gun in a spray coating booth to a material to be coated, the excessive oversprayed paint which is not coated on the material to be coated is received by a receiver of the present invention which is placed vertically between the material to be coated and a ventilating fan, flown downward and recovered in a paint recovering vessel which is located at a lower area. Since the recovered paint is not so much diluted, said paint may be recycled as it is or after simple concentration or simple adjustment of the components.

EXAMPLES

The present invention will be further illustrated by way of the following examples which, however, do not limit the scope of the present invention thereto.

Example 1

Figure 4:
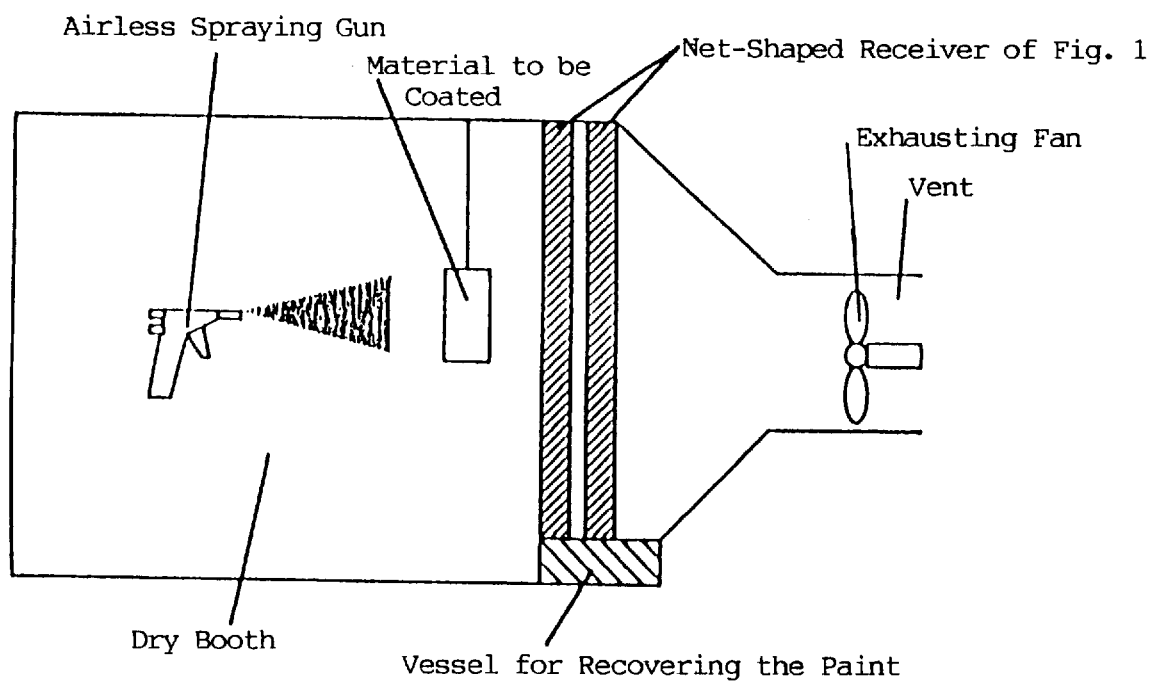
FIG. 4 shows an outline of a spray coating booth in which a receiver of FIG. 1 is placed.

A receiver prepared by making hollow fiber of an UF membrane into a net-like shape as shown in FIG. 1 was arranged in two parallel rows without intervals where the UF membranes of the receiver are alternated as shown in FIG. 4. Incidentally, a paint recovering vessel was placed as a tank for reserving a paint flown down from a receiver (as if a bowl for reserving a dropping liquid).

Example 2

Figure 5:
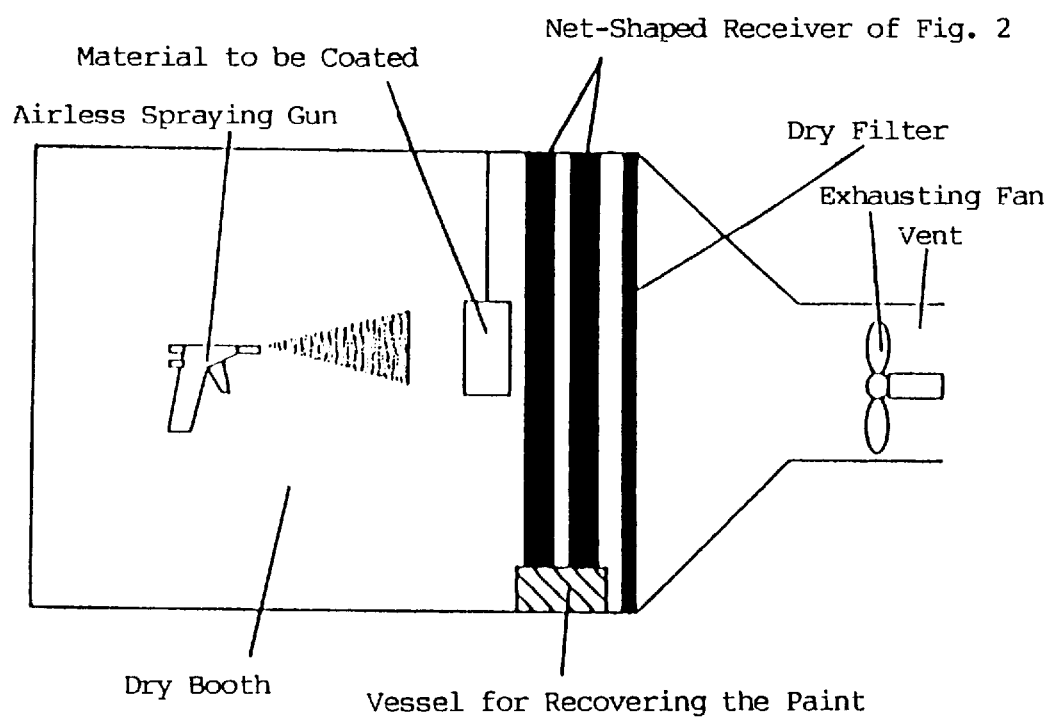
FIG. 5 shows an outline of a spray coating booth in which a receiver of FIG. 2 is placed.

Two or more receivers prepared by spirally winding hollow fiber of an UF membrane on the surface of a rod-like support as shown in FIG. 2 were made in parallel and was arranged in two rows without intervals alternately as shown in FIG. 5. Incidentally, a paint recovering vessel was placed as same as in Example 1.

Test Example 1

Xylene was passed through the receivers of Examples 1 and 2 prepared as such and, in a spray coating booth environment at the room temperature of 23° C., "Stanlac #90" (anticorrosive paint of a type drying at ambient temperature; solid content: 36%; manufactured by Shinto Paint Co., Ltd.) (the solid content being adjusted with xylene) was subjected to an air spray coating for five seconds at an emitting rate of 300 g of the paint per minute followed by allowing to stand for 60 seconds. This was repeated for 36 times and the paint in an amount of 900 g as a whole was subjected to an air spray coating in a state where no material to be coated was present. After that, this was allowed to stand for ten minutes and the amounts of recovered paint and of solid content in the recovered paint received in the recovering vessel for the oversprayed paint placed under the receiver were measured. Further, a paint was prepared wherein the solid content in the recovered paint was adjusted to 36% using xylene and the weight of the paint adjusted as such was measured. Furthermore, the weight of the adjusted paint to that of the coated paint was measured as a recovery rate. The results are given in Table 1.

TABLE 1

| Type of the Receiver | Example 1 | Example 2 |
|---|---|---|
| Shape of the Receiver | net-shaped | rod-shaped |
| Emitted Amount of Paint (grams/minute) | 300 | 300 |
| Total Coating Time (minutes) | 3 | 3 |
| Coated Paint Amount (grams) | 900 | 900 |
| Recovered Paint Amount (grams) | 802 | 811 |
| Solid Content in Recovered Paint (%) | 40 | 38 |
| Weight of Adjusted Paint (grams) | 891 | 856 |
| Recovery Rate (%) | 99 | 90 |
| | (decimals raised to a unit) | |

Example 3

A receiver prepared by making hollow fiber of an UF membrane into a net-like shape as shown in FIG. 1 was arranged in two parallel rows without intervals where the UF membranes of the receiver were alternated as shown in FIG. 4. Incidentally, a paint recovering vessel was placed as a tank for reserving a paint flown down from a receiver (as if a bowl for reserving a dropping liquid).

Example 4

Two or more receivers prepared by spirally winding hollow fiber of an UF membrane on the surface of a rod-like support as shown in FIG. 2 were made in parallel and was arranged in two rows without intervals alternately as shown in FIG. 5. Incidentally, a paint recovering vessel was placed as same as in Example 3.

Test Example 2

The receivers of Examples 3 and 4 prepared as such were air-sprayed in a spray coating booth environment at the room temperature of 23° C. with "Aubas AW #70" (an aqueous anticorrosive paint of a type drying at ambient temperature; solid content: 36%; manufactured by Shinto Paint Co., Ltd.) for five seconds at an emitting rate of 300 g of the paint per minute followed by allowing to stand for 60 seconds. This was repeated for 36 times and the paint in an amount of 900 g as a whole was subjected to an air spray coating in a state where no material to be coated was present. After that, this was allowed to stand for ten minutes and the amounts of recovered paint and of solid content in the recovered paint received in the recovering vessel for the oversprayed paint placed under the receiver were measured. Further, a paint was prepared wherein the solid content in the recovered paint was adjusted to 36% using water and the weight of the paint adjusted as such was measured. Furthermore, the weight of the adjusted paint to that of the coated paint was measured as a recovery rate. The results are given in Table 2.

TABLE 2

| Type of the Receiver | Example 3 | Example 4 |
|---|---|---|
| Shape of the Receiver | net-shaped | rod-shaped |
| Emitted Amount of Paint (grams/minute) | 300 | 300 |
| Total Coating Time (minutes) | 3 | 3 |
| Coated Paint Amount (grams) | 900 | 900 |
| Recovered Paint Amount (grams) | 623 | 750 |
| Solid Content in Recovered Paint (%) | 37 | 36 |
| Weight of Adjusted Paint (grams) | 641 | 750 |
| Recovery Rate (%) | 72 | 84 |
| | (decimals raised to a unit) | |

As such, in accordance with the method for recovering the paints of the present invention, the oversprayed paint in a spray coating booth used for coating a material can be easily recovered for reuse as it is or after a simple adjustment. Accordingly, an excessive use of a paint can be saved and the amount of waste paint is reduced whereby it is no longer necessary to discard the filters of the spray coating booth or to subject a wet dust collector to a solid-liquid separation for a long period. Thus, it is clear that this is an excellent method for recovering the paints.

MERITS OF THE INVENTION

The present method is quite appropriate as a method for recovering the paints where, in a spray coating booth used for coating a material, the oversprayed paint can be easily recovered for reuse as it is or after a simple adjustment.

In the receiver of the present, the oversprayed paint can be easily recovered only by oozing out the water or the organic solvent from the surface of the hollow fiber membrane and, since the recovered paint shows only little change in the concentration, it can be reused as it is or after simple concentration, adjustment of the components, etc. Further, the receiver is hardly stained with the adhered paint and can be used for a long period and, in addition, it can be manufactured by a simple method. Accordingly, it is quite suitable as a receiver for oversprayed paints.

What is claimed is:

1. A method for recovering paints, comprising the steps of placing a receiver comprising at least one of an ultrafiltration membrane and a microfiltration membrane in a spray coating booth for receiving oversprayed paint, and passing at least one of water and organic solvent through said membrane from one side thereof to the other side thereof, and receiving and recovering the oversprayed paint at the other side of said membrane.

2. A method accordingly to claim 1, wherein said membrane comprises a hollow fiber membrane.

3. A receiver for recovering paints, comprising at least two hollow fiber membranes arranged on a plate wherein at least one end of the membranes is open, a fixing material for fixing and holding the hollow fiber membranes on the plate and distributing pipes connecting to the open end of each of the hollow fiber membranes.

* * * * *